(12) United States Patent
Janakiraman et al.

(10) Patent No.: US 11,785,063 B2
(45) Date of Patent: Oct. 10, 2023

(54) SHARING AND COLLABORATING ON CONTENT OBJECTS DURING A VIDEO CONFERENCE

(71) Applicant: Zoom Video Communications, Inc., San Jose, CA (US)

(72) Inventors: Arun Janakiraman, San Francisco, CA (US); Yeki Giles, Santa Clara, CA (US); Ross Douglas Mayfield, Palo Also, CA (US); Shishir Sharma, Ottawa (CA)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/472,093

(22) Filed: Sep. 10, 2021

(65) Prior Publication Data

US 2023/0083688 A1   Mar. 16, 2023

(51) Int. Cl.
*H04L 65/403* (2022.01)
*G06F 9/451* (2018.01)
*G06F 3/0482* (2013.01)

(52) U.S. Cl.
CPC ............ *H04L 65/403* (2013.01); *G06F 3/0482* (2013.01); *G06F 9/452* (2018.02)

(58) Field of Classification Search
CPC ........ H04L 29/06; G06F 3/0482; G06F 9/451; H04N 7/15; H04N 7/147; H04L 65/403
USPC .......................................... 348/14.01-14.16
See application file for complete search history.

(56) References Cited

U.S. PATENT DOCUMENTS

| | | | |
|---|---|---|---|
| 6,243,452 B1 | 6/2001 | O'Shaughnessey et al. | |
| 11,079,995 B1* | 8/2021 | Hulbert et al. | G06F 3/0485 |
| 2004/0128350 A1* | 7/2004 | Topfl et al. | H04N 7/147 709/204 |
| 2010/0257451 A1 | 10/2010 | Halevi et al. | |
| 2016/0330404 A1* | 11/2016 | Nelson et al. | H04M 7/0027 |
| 2019/0361694 A1* | 11/2019 | Gordon et al. | G06F 1/3231 |
| 2020/0372140 A1* | 11/2020 | Jaber et al. | H04L 12/1822 |
| 2022/0103603 A1* | 3/2022 | Vendrow | H04L 65/403 |

FOREIGN PATENT DOCUMENTS

JP          2004146913 A *  5/2004 .................. H04N 7/142

* cited by examiner

*Primary Examiner* — Melur Ramakrishnaiah
(74) *Attorney, Agent, or Firm* — Kilpatrick Townsend & Stockton LLP

(57) ABSTRACT

One example method includes joining, using a video conferencing application, a video conference hosted by a video conference provider, the video conference having one or more participants; executing, within an execution environment provided by the video conferencing application, a software application to access a content object; receiving a command to share the content object to the one or more participants; and providing the content object to the one or more participants via the video conference provider.

20 Claims, 11 Drawing Sheets

SHARING AND COLLABORATING ON CONTENT OBJECTS DURING A VIDEO CONFERENCE

FIELD

The present application generally relates to video conferencing and more particularly relates to sharing and collaborating on content objects during a video conference.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
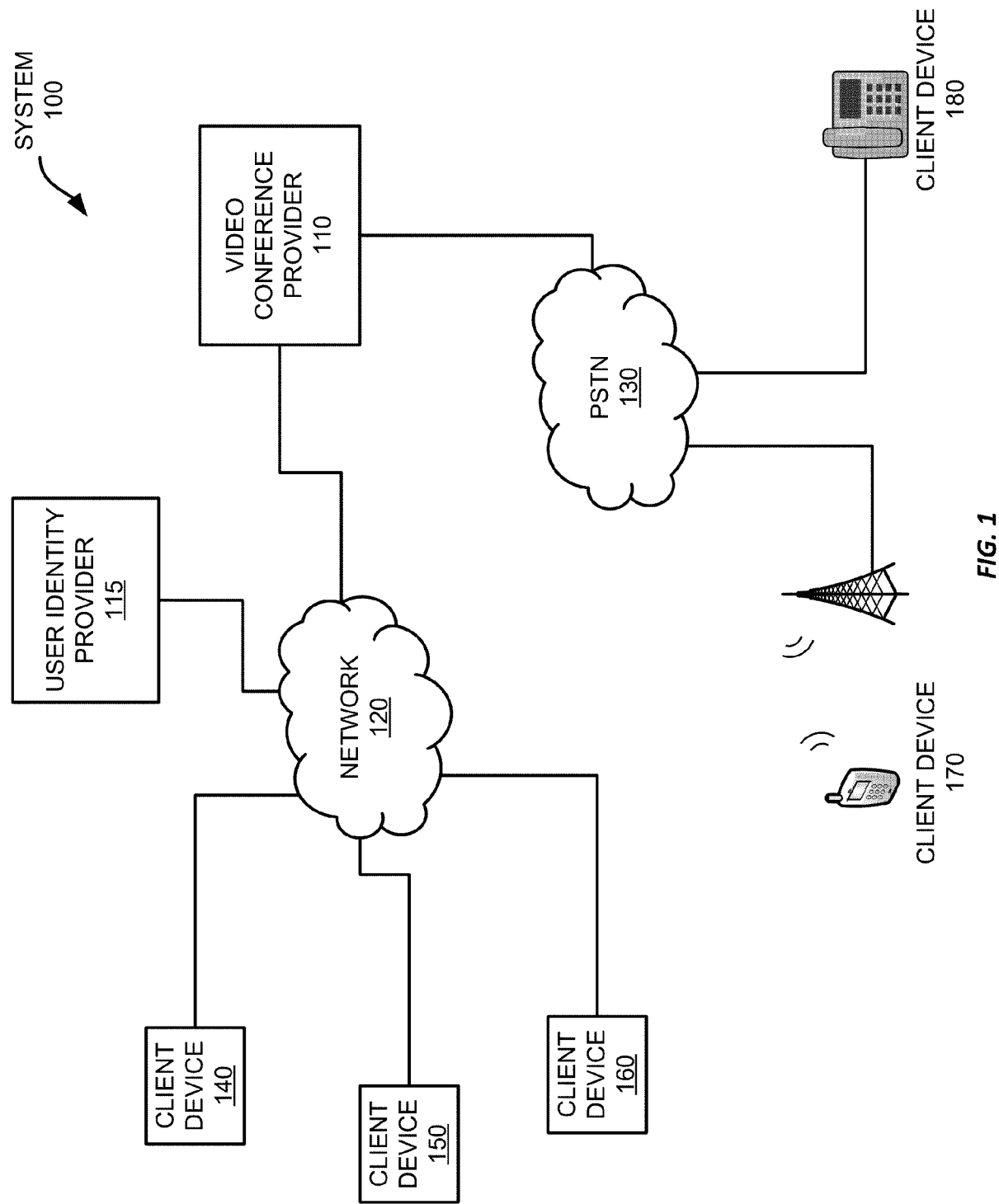
FIGS. 1-2 show example systems for integrating software application content into video conferences.

Examples are described herein in the context of sharing and collaborating on content objects during a video conference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a video conference, multiple participants may be discussing a common piece of content, such as a document, on which they are collaborating. Conventionally, a participant may share a view of the document by using a "share window" control which allows a view of a portion of the sharer's screen to be transmitted as a video feed to others, who can view whatever is shown in the shared window. However, the other participants are essentially watching a video of the sharer as they work on the document.

An example according to this disclosure allows a user to share a content object with other participants who can individually interact with the content object and, depending on the access level granted them, edit the content object contemporaneously with the rest of the participants in the video conference. To do so, the owner of the content object launches a corresponding software application to access the content object. The software application is launched through the video conferencing application and executes within an execution environment provided by the video conferencing application, such as a web application within an embedded web browser. The software application then becomes visible within the video conferencing application's graphical user interface ("GUI") and the owner can begin editing the content object.

To allow others in the video conference to access the content object, the owner can select an option to "share" or "collaborate" on the content object, which causes the video conferencing application to transmit the content object to the other participants in the video conference. To allow collaboration, the video conferencing application may transmit a uniform resource locator ("URL") to the other participants to allow them each to access the same copy of the content object, though a copy of the content object may be transmitted in some examples.

In addition to sending the content object, the owner also establishes access levels for each of the participants. These access levels may include read-only, comment-only, editor, or owner, and may be selected individually or en masse for all participants by the owner.

When the participant's video conferencing applications receive the content object, it attempts to execute the same software application that was launched by the owner. If the participant has the application installed, it is automatically launched and the content object is loaded. If the participant does not have the application installed, it is obtained from another source, such as the video conference provider, the application publisher, or the sharer of the content object, and it is executed within the video conferencing application's execution environment. Since the software application in this example is a web application, it may be seamlessly executed during the video conference, and once the video conference ends, it may be discarded or permanently installed, depending on the participant's ability to install software on their client device.

When the participant's execute the software application, the content object is loaded according to the access level granted by the owner. If a participant is unable to run the application, they may still be provided a view of the content object using conventional window sharing functionality, which grants them de facto read-only access. The participants are then able to interact with the content object using whatever tools are provided by the software application and, depending on their access levels, comment or edit the content object collaboratively with the other participants.

At the end of the video conference, or whenever the owner elects to stop sharing the content object, the owner's video conferencing application sends an indication to the other participants to terminate access to the content object, which may involve deleting the information needed to access the content object, such as the URL or any encryption keys. Thus, access to the content object can be bounded by the scope of the video conference and the owner is able to retain control over the content object.

Such techniques can enable individuals to more efficiently collaborate on content they are developing. By incorporating the software application and collaboration functionality into the video conferencing application, the functionality of each enhances the capabilities of the other, thus providing a more seamless collaboration experience. In addition, because the software applications execute within the context of the video conference application, it can be easier for a participant to gain access to the software application, rather than needing to manually install software and, potentially, involve a system administrator with appropriate access rights to the participant's client device. Thus, it can enable any participants to quickly join the collaborative session.

According to this disclosure, one example method for sharing and collaborating on content objects during a video conference includes joining, using a video conferencing application, a video conference hosted by a video conference provider, the video conference having one or more participants; executing, within an execution environment provided by the video conferencing application, a software application to access a content object; receiving a command to share the content object to the one or more participants; and providing the content object to the one or more participants via the video conference provider.

One example client device includes a communications interface; a non-transitory computer-readable medium; and one or more processors communicatively coupled to the communications interface and the non-transitory computer-readable medium, the one or more processors configured to execute processor-executable instructions to join, using a video conferencing application, a video conference hosted by a video conference provider, the video conference having one or more participants; execute, within an execution environment provided by the video conferencing application, a software application to access a content object; receive a command to share the content object to the one or more participants; and provide the content object to the one or more participants via the video conference provider.

One example non-transitory computer-readable medium includes processor-executable instructions configured to cause one or more processor to join, using a video conferencing application, a video conference hosted by a video conference provider, the video conference having one or more participants; execute, within an execution environment provided by the video conferencing application, a software application to access a content object; receive a command to share the content object to the one or more participants; and provide the content object to the one or more participants via the video conference provider.

These illustrative examples are given to introduce the reader to the general subject matter discussed herein and the disclosure is not limited to these examples. The following sections describe various additional non-limiting examples and examples of sharing and collaborating on content objects during a video conference.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
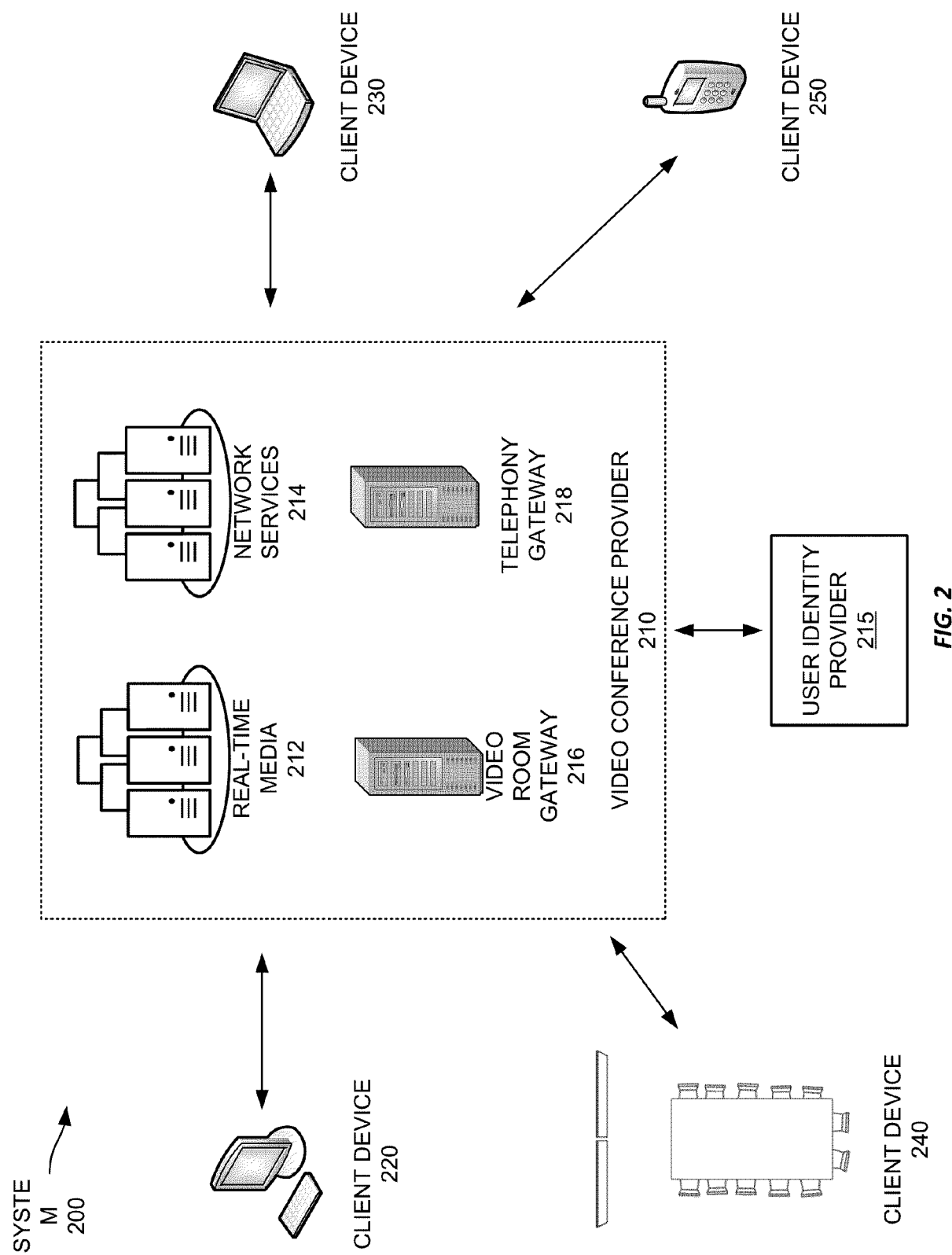

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers

214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
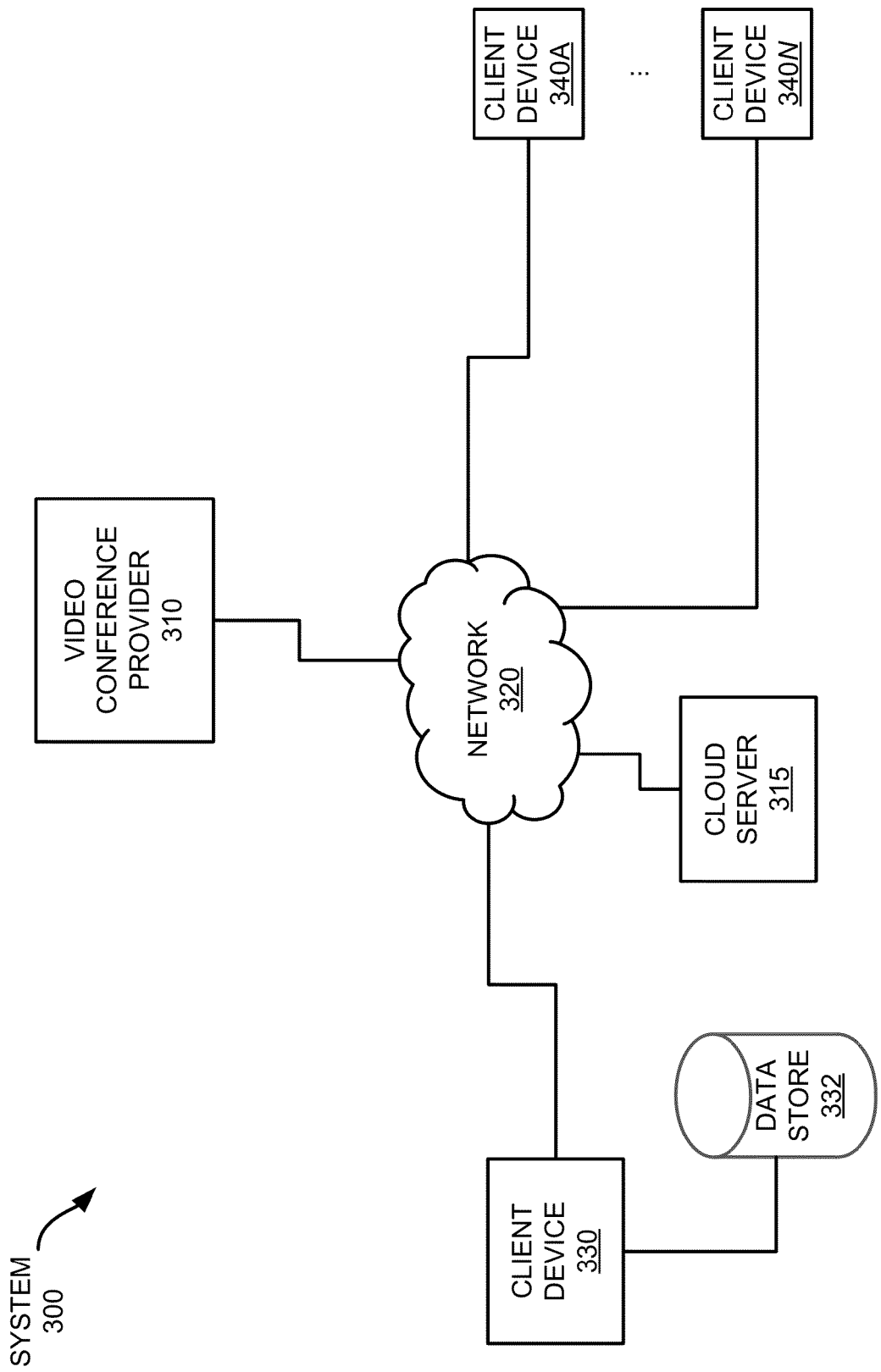
FIGS. 3A-3B show an example system for sharing and collaborating on content objects during a video conference.
Figure 3B:
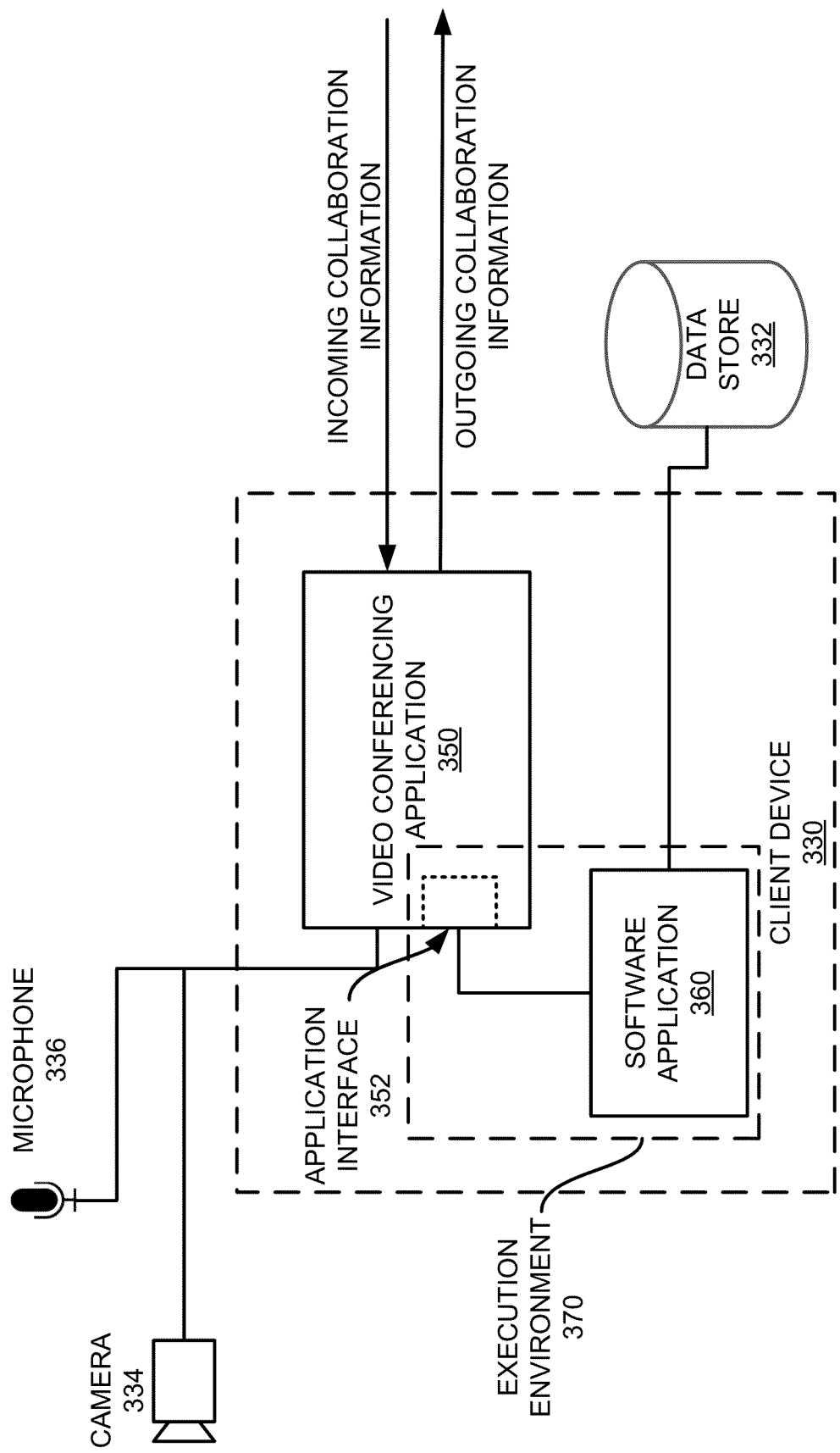

Referring now to FIGS. 3A-3B, FIG. 3A shows an example system 300 for sharing and collaborating on content objects during a video conference. In this example system 300, a number of client device 330, 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

Referring now to FIG. 3B, each client device, e.g., client device 330, executes a video conferencing application 350, which connects to the video conference provider 310 and joins a meeting. During the meeting, the various participants (using video conference software at their respective client devices 330, 340a-n) are able to interact with each other to conduct the meeting, such as by viewing video feeds and hearing audio feeds from other participants, and by capturing and transmitting video and audio of themselves. However, during the meeting, a participant using client device 330 executes a software application 360 to access and collaborate on content with the other participants in the video conference. To do so, the participant selects an option in the video conferencing application 350 to launch a desired application, which is then executed within the context of an execution environment 370 provided by the video conferencing application 350, such as within an embedded web browser. For example an application may be hosted at a URL corresponding to the shared content object and by accessing the content via a corresponding web application.

Depending on the content to be provided, the user of client device 330 may execute any suitable software application. For example, to present a document, such as a word processing document, spreadsheet, presentation, etc., the user may execute a corresponding application to access, view, and edit the desired document. Other types of content may be presented using corresponding applications as well, such as videos, images, games, simulations, software development tools, visualization tools, etc. The software application 360 may access content objects stored within a local data store 332 or it may access content objects located remotely, such as on a cloud server 315 in a cloud computing environment.

To share and collaborate on the content from the software application, the user may select an option in the application or the video conferencing application to share the content object with the other participants. After selecting the option to share, the software application 360 sends an indication to the video conferencing application 350, e.g., via an application programming interface ("API") 352, to share the content object. The video conferencing application 350 obtains the content object from the software application and provides it to the video conference provider 310, which provides it to the other participants, which may be done according to their respective capabilities. For example, the video conference provider 310 may not provide the content object to a participant who has dialed into the video conference using a telephone. Or if the participant has joined via dedicated video conferencing equipment, e.g., dedicated equipment for a video conference room 240, that may not be capable of receiving or accessing the content object, the video conference provider 310 may withhold the content object from such devices.

For client devices 340a-n that receive the content object, each may attempt to execute a software application associated with the content object, e.g., a document editor, a video editor, a presentation application, etc. This may be performed based on information sent with the content object, or based on information contained within the content object itself, e.g., based on a header in the content object, a file extension of the content object, etc. If the client device 340a-n has the corresponding application installed, it may launch the application within a corresponding execution environment provided by its copy of the video conferencing application. However, if the recipient client device 340a-n lacks the software application, it may send an indication to the video conference provider 310 that it needs a copy of the software application 360. In response, the video conference provider 310 may push a copy of the software application 360 to the client device 340a-n, or it may direct the client device to another computing device from which to obtain the software application, which may be client device 330 or a cloud server, e.g., cloud server 315.

In this example, the video conferencing application 350 employs an embedded web browser to provide an execution environment, thus, client devices 340a-n that need to obtain the application, may receive a web application from a remote computing device and run the web application within the web browser. Such a technique may allow a participant to view and interact with content during the video conference using functionality that otherwise is not available on their client device and which might otherwise involve assistance from a system administrator. Further, when the user exits the video conferencing application 350, leaves the video conference, or the owner of the content object stops sharing the content object, the software application 360 may exit and in some examples be removed from the client device, which may allow the owner to maintain control over the content object after the video conference has ended. Though in some examples, access to the content object may persist until the owner changes access settings for the content object.

In addition to sharing the content object, the client device 330 may also establish access levels to the content object for the participants in the video conference. For example, when the user selects an option to share the content object, they may be presented with options to assign access levels to other participants. Thus, when the respective participant accesses the shared content object, their ability to interact with the content object may be limited to certain functionality.

Once a participant receives a content object and launches the corresponding software application 360, they are presented with a GUI including a view of the content object. They may then interact with the content object independently of the other participants in the video conference. Thus, they may interact with the content object during the video conference and collaborate with other participants, without a single participant controlling the view and interaction with the content object. This may allow the participants to more easily and intuitively collaborate on the content object during the video conference.

If a participant is unable to obtain the corresponding application, e.g., they are using a client device without user input devices, such as in a dedicated video conferencing room, or that lacks the capability to run the software application 360, the video conferencing application 350 may send an indication to the client device 330 sharing the content object that they are unable to access the content object. The client device 330 may then generate and transmit an additional multimedia stream sharing the client device's view of the content object. This may allow the participant to view the content object, but without any ability to interact with it.

Once the participants have completed the video conference, or have finished collaborating on the content object, the participant sharing the content object can close their software application. In some examples, this may terminate access to the content object to the other participants. In other examples, however, the other participants may retain access to the content object and may continue to interact with it, including after the video conference concludes in some examples.

Figure 4A:
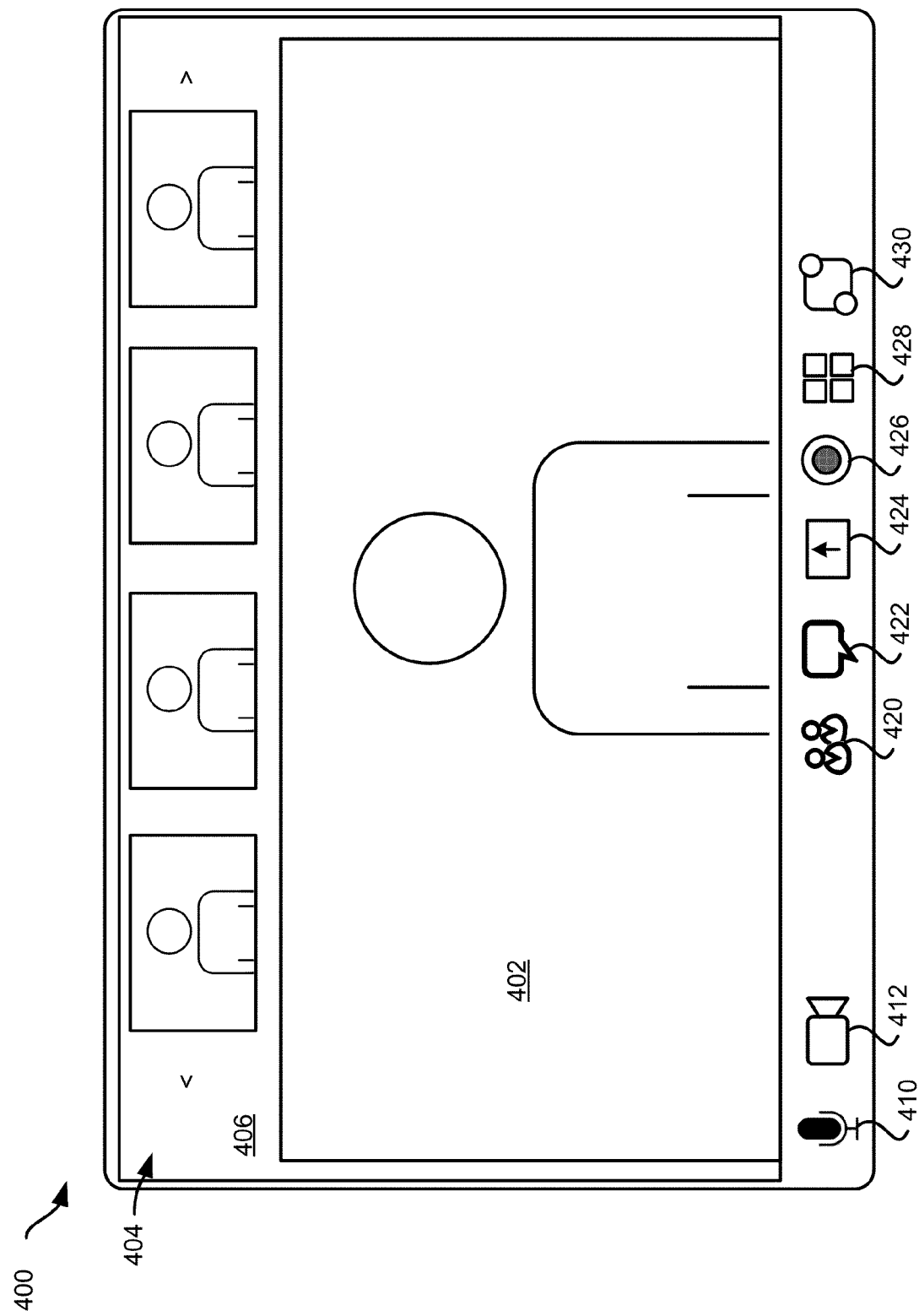
FIGS. 4A-4D show example graphical user interfaces for sharing and collaborating on content objects during a video conference.

Referring now to FIGS. 4A-4D, FIGS. 4A-4D illustrate an example GUI 400 for sharing and collaborating on content objects during a video conference. FIG. 4A shows the GUI 400 for a video conferencing application 350 while no content object is being shared. In this example, the GUI 400 includes a speaker view window 402 that presents the current speaker in the video conference. Above the speaker view window 402 are smaller participant windows 404, which allow the participant to view some of the other participants in the video conference, as well as controls ("<" and ">") to let the host scroll to view other participants in the video conference. Both the speaker view window 402 and the participant windows are overlaid on a background 406, which is a solid black background in the GUI 400.

Beneath the speaker view window 402 are a number of interactive elements 410-428 to allow the participant to interact with the video conference software. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room. Finally, control 430 allows the participant to launch an application, which may share content with the other participants in the video conference as described within this disclosure.

Figure 4B:
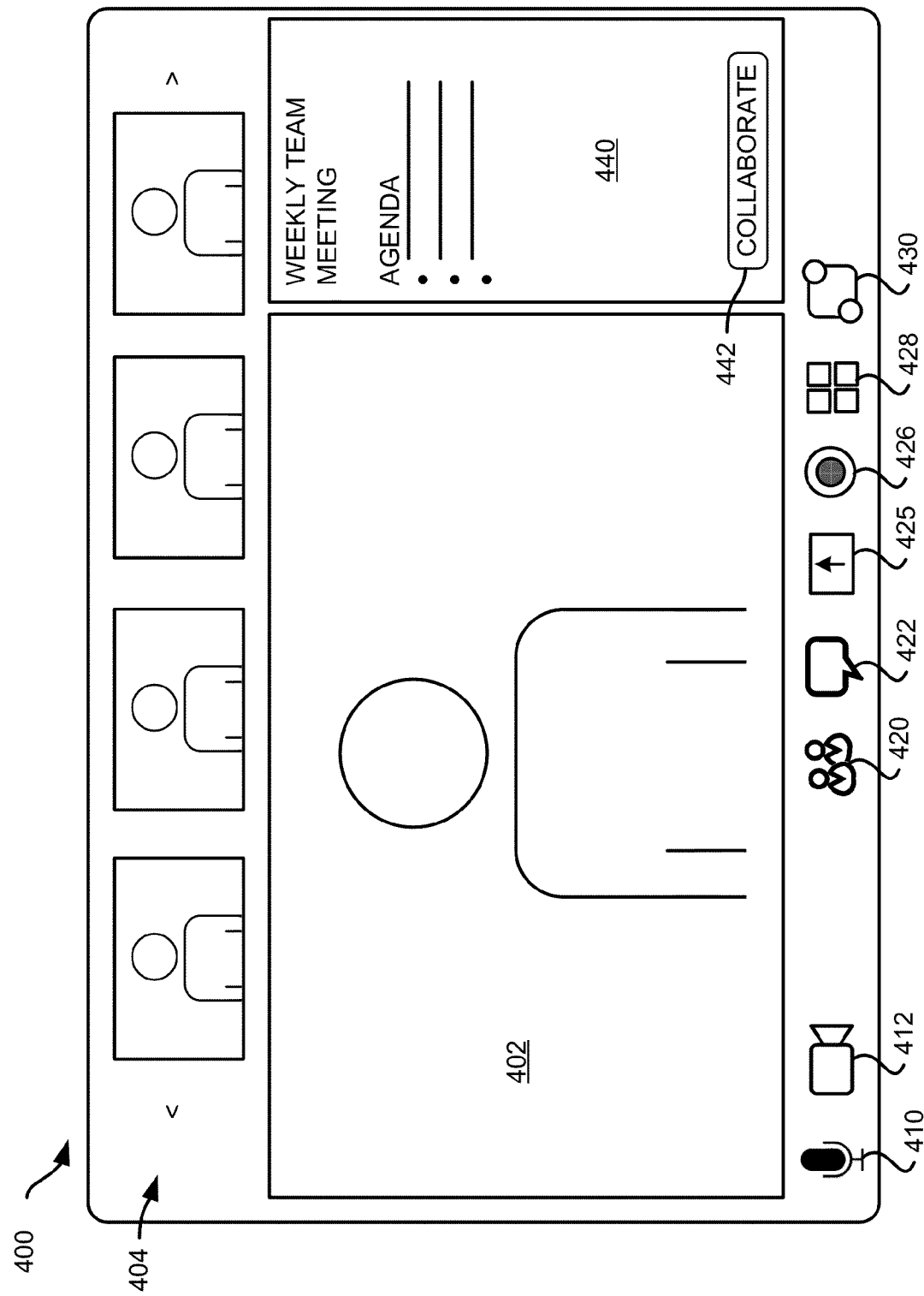

Referring now to FIG. 4B, the user of client device 330 has launched a software application 360 by selecting control 430 and identifying the desired application. The user has then selected a content object to open and share with the participants in the video conference, but has only initially opened it privately within its own GUI 440. This configuration allows a user to work within an application during a video conference, while retaining the default features of the GUI 400, such as the speaker view 402. However, the GUI 440 also provides the user with a "collaborate" option 442 to share a content object accessed by the software application with other participants in the video conference.

Figure 4C:
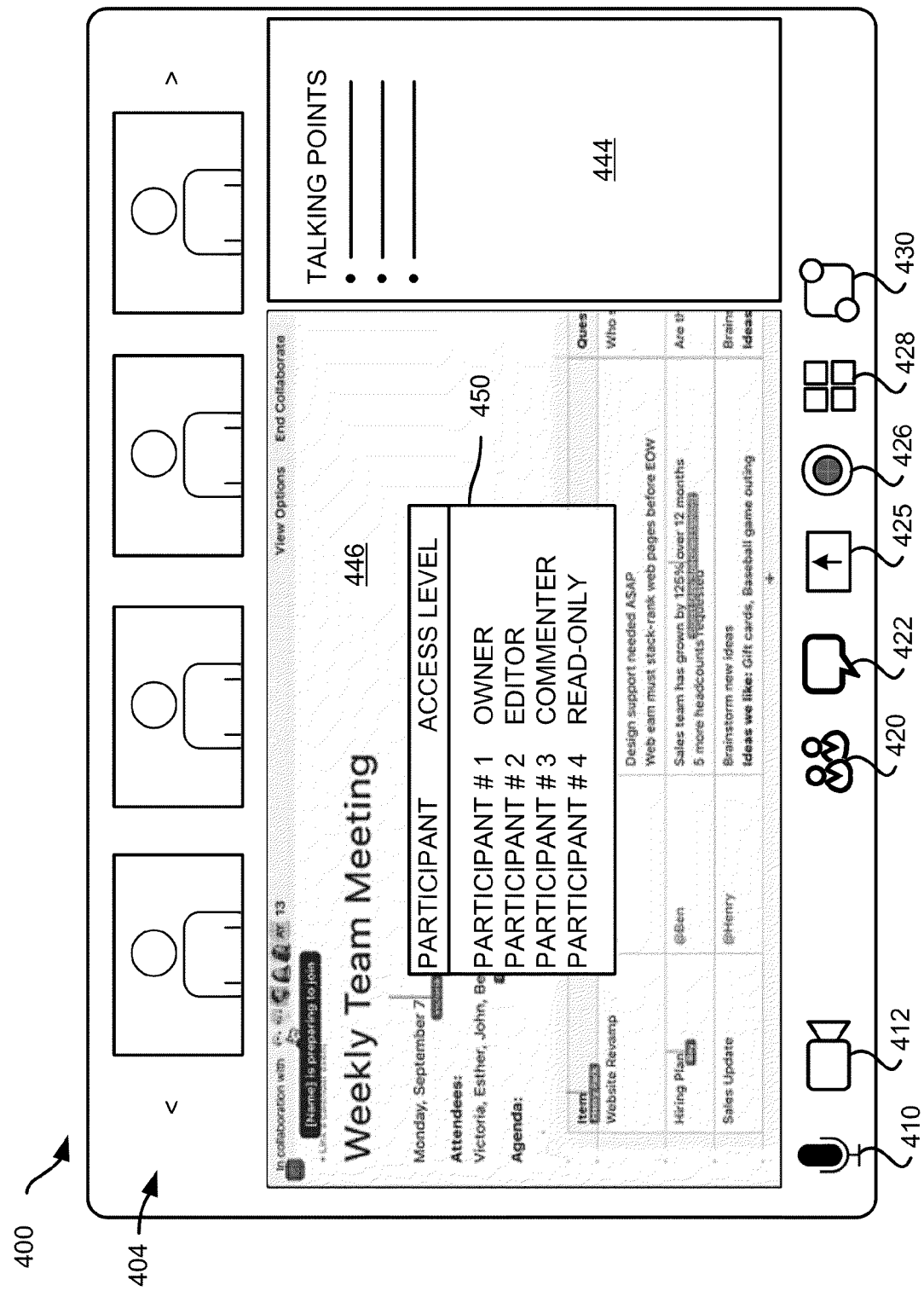

Referring now to FIG. 4C, after selecting the "collaborate" option 442, the speaker window 402 is replaced by GUI 446 with the shared content object, and the user is presented with a menu 450 within which the user may identify participants and establish access levels for each. An additional GUI 444 is presented that includes information associated with the shared content object, but that is not shared with the other participants. For example the content object may include a presentation having a number of slides as well as talking points or notes for each slide. Depending on the participants' access levels, they may only be able to view the presentation slides, but not the talking points. However, in some examples, a separate GUI 444 with private information may not be displayed.

The menu 450 presents available access levels, which in this example include "owner," "editor," "commenter," and "read-only." The "owner" access level provides unfettered access to all aspects of the content and includes the ability to delete the content object, change any aspect of the content object, change access levels for other users, etc. The "editor" access level allows a user to edit the contents of the content object, but not to change access levels or delete the content object. The "commenter" access level allows a user to insert comments into the content object, but no other ability to edit the content object. The "read-only" access level only allows a user to view some (or all) of the contents within the content object. Still other or different access levels may be used for various types of content objects.

In this example, the user is presented with the menu 450 because it is the first time the content object is shared with the participants in the video conference. If the other participants had previously obtained access to the content object, the menu 450 may not be shown, or may only include participants that had not previously been granted access to the content object.

While in this example, the sharing user is presented with a menu 450, in some examples, access levels may be established based on participants' roles in the meeting without the sharing user's intervention. For example, the meeting host (or co-host) may be granted "owner" or "editor" access, while ordinary participants may only be granted "commenter" or "read-only access." To establish permissions based on participant roles, the sharing user's video conferencing application 350 may obtain the role information for each participant from the video conference provider 310 and establish a corresponding access level for each participant for the content object.

Figure 4D:
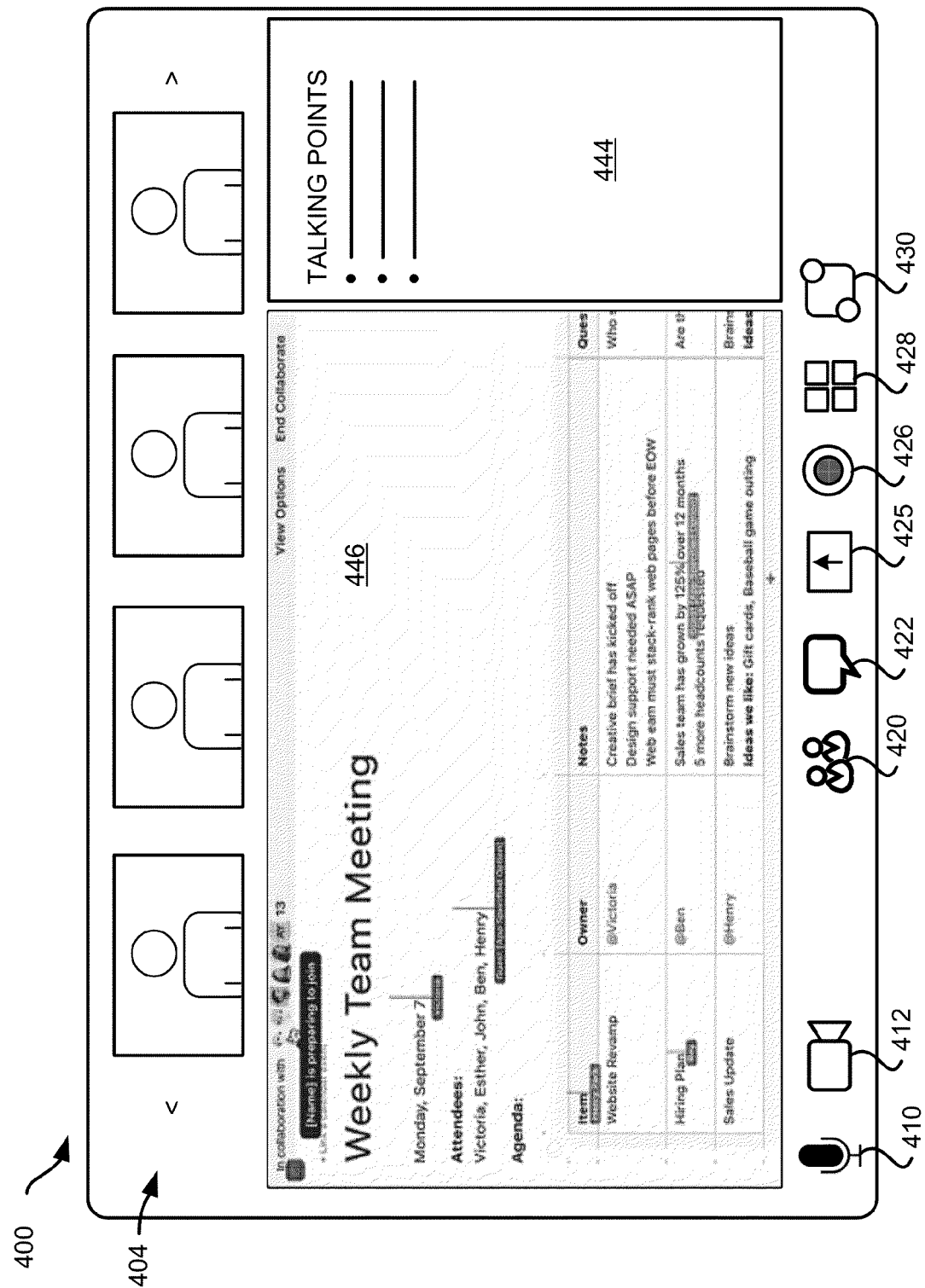

Referring now to FIG. 4D, FIG. 4D shows the GUI 400 once the content object has been shared with the other participants and they are collaboratively interacting with the content object. At this time, the menu 450 has closed and the GUI 446 with the content object is displayed and usable by the user. Further, at their respective client devices, the participants interact with the content object according to their respective access levels. Further, the sharing user can also interact with GUI 444 to edit the privately accessible information associated with the shared content object.

At the end of the video conference, or when the participants finish collaborating on the shared content object, the GUI reverts to the configuration shown in FIG. 4A or in FIG. 4B, depending on whether the user closes the application or leaves it open. The access levels assigned to the various participants, in this example, persist and each of the participants is able to later access the shared content object and continue to interact with it according to the respective access level. However, in some examples, access levels may be assigned that only persist for the duration of the collaboration session and are reverted to previously existing access levels, if any, or access may be entirely revoked.

Figure 5:
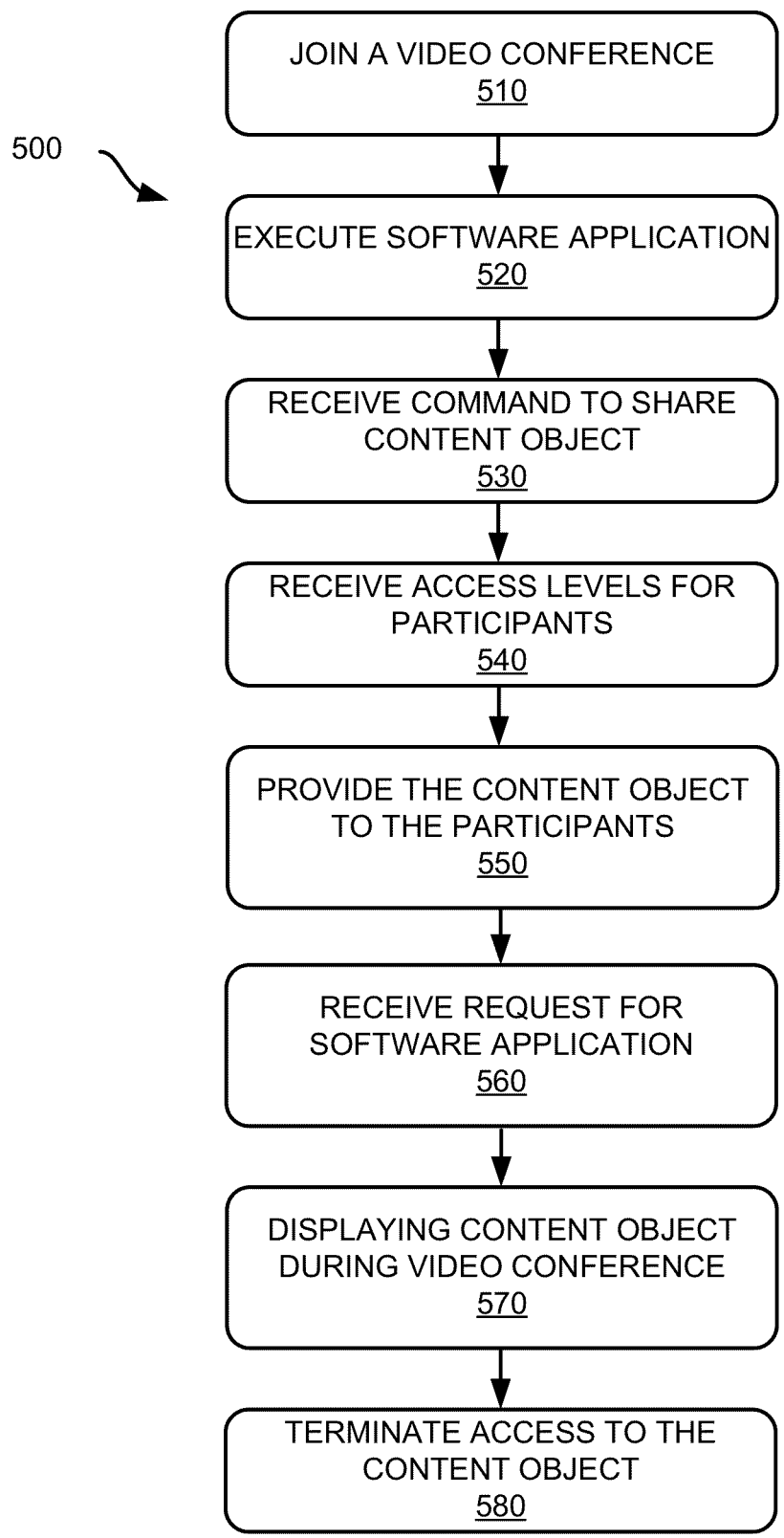
FIGS. 5-6 show example methods for sharing and collaborating on content objects during a video conference.

Referring now to FIG. 5, FIG. 5 shows an example method for sharing and collaborating on content objects during a video conference. This example will be discussed with respect to the system shown in FIGS. 3A-3B and the GUIs shown in FIGS. 4A-4D, but any suitable systems or GUIs may be employed according to different examples.

At block 510, a user uses a video conferencing application 360 running on their client device 330 to join a video conference hosted by a video conference provider 310, generally as described above with respect to FIGS. 1 and 2.

At block 520, the user executes a software application 360 within an execution environment 370 provided by the video conferencing application 350 to access a content object. As discussed above, the video conferencing application 350 may provide an execution environment 370, such as an embedded web browser, a java virtual machine, etc., to allow software applications to execute within the context of the video conferencing application 350. In this example, the software application 360 has been previously installed on the user's client device 330, though in some examples, the user may install the software application 360 during the process of accessing the content object, or may select an option to install the software application 360 and subsequently execute it within the execution environment 370.

At block 530, the video conferencing application 350 receives a command to share the content object to one or more participants in the video conference. As discussed above with respect to FIG. 4B, the user may select a "collaborate" option 442 to share a content object with the other participants. In this example, the "collaborate" option is provided by the software application 360 and the video conferencing application 350 receives the command to share the content object from the software application 360, though in some examples, the "collaborate" option is provided by the video conferencing application 350, which receives the command from the user, and may provide an indication to the software application 360 that the content object will be shared. Though in some examples, it may not notify the software application 360.

In some examples, the command may indicate one or more participants to share the content object with. For example, the user may be presented with an option to identify access levels for each participant, as was described above with respect to FIG. 4C and will be described below with respect to block 540. One of the access levels may indicate "do not share," which indicates that the content object will not be shared with the corresponding participant. In some examples, whether content is shared with a particular participant may be mediated by the video conferencing application 350, which may only provide the content object to those identified as having access to it, though in some examples, it provides the content object to each participant, and allows the application to mediate access according to assigned access levels.

At block 540, the video conferencing application 350 receives access levels for one or more participants. In this example, the software application 360 employs the video conferencing application 350 via an API 352 to present a GUI element, e.g., menu 450, to obtain access level information for one or more of the participants. As discussed above, the access levels may indicate which actions a user may take with respect to the content object. Further, in some examples as discussed above, a participant may be denied access to the content object, such as by selecting a "no access" option corresponding to the participant.

It should be appreciated that in some examples, the video conferencing application 350 may not receive any information relating to access levels. For example, access levels may have already been established, or access levels may be entirely managed within the software application 360 without involving the video conferencing application 350. For example, one or more software applications 360 may be executed within the execution environment outside the context of a video conference.

At block 550, the video conferencing application 350 provides the content object to the one or more participants. Depending on the type of content object to be shared, the video conference application 350 may provide the content object in different ways. In some examples, the content object may be accessible via a URL, thus the video conferencing application 350 receives the URL from the software application 360 and provides it to the video conference provider 310 to distribute to the one or more participants. However, in some examples, the content object may be a file, in which case, the video conferencing application 350 transmits the file to the video conference provider 310, which distributes it to the one or more participants.

In some examples, a participant may not be able to access or execute a copy of the software application 360 to access the shared content object. To handle this, the video conference provider 310 may provide an indication to the video conferencing application 350 executing on the user's client device 330. In response, the video conferencing application 350 may generate a further multimedia stream sharing the graphical output of the software application 360 to the participant who is unable to access or execute the copy of the software application. To do so, the video conferencing application 350 may provide the multimedia stream to the video conference provider 310 and identify the participant to receive the multimedia stream. The video conference provider 310 may then distribute the multimedia stream to only the identified participant(s).

At block 560, the video conferencing application 350 receives a request for the software application from at least one participant. As discussed above, a participant may not have the software application installed on their client device. Thus, their client device may transmit a request for the software application. Such a request may be sent to different locations, but if it is received by the user's client device 330, the video conferencing application 350 may provide a copy of the software application 360 to the requesting client device, or it may provide a location, e.g., a URL, identifying where to obtain the software application.

At block 570, the video conferencing application 350 displays the shared content object during the video conference. As discussed above with respect to FIG. 4D, the video conferencing application 350 displays a GUI 446 that includes the shared content object, within which the user may interact with the shared content object and also see actions taken by the other participants. In this example, the video conferencing application 350 also displays a GUI 444 that is only visible to the user to edit one or more content objects associated with the shared content object that are not shared with the other participants. And while the software application 360 is responsible for the display of such features, they are performed within the context of the video conferencing application 350 and created and output to the video conferencing application 350 for display via the API 352.

At block 580, the video conferencing application 350 transmits an indication to terminate access to the content object. In this example, access to the content object was provided temporarily during the video conference and, upon conclusion of the video conference, the video conferencing application 350 transmits an indication to the software application 360 that the video conference has concluded. In response, the software application 360 revokes access to the content object from the other participants. Alternatively, the indication may be sent if the user closes the content object or exits the software application 360, even if the video conference has not concluded.

However, in some examples, access to the content object may persist for the other participants even after the video conference has ended or after the software application 360 has closed the content object or exited. Thus, access to the content object may be adjusted by the software application 360 at various times, independently of any video conference.

While the method 500 has been described as having certain features, it should be appreciated that some or all of the blocks may be re-ordered or omitted. For example, blocks 540, 560, or 580 may be omitted in some examples. Further, if a participant joins the video conference after the content object has been shared, the method 500 may return (in part) to block 550 to provide the shared content object to the next participant. Still further variations may be employed in different example methods according to this disclosure.

Figure 6:
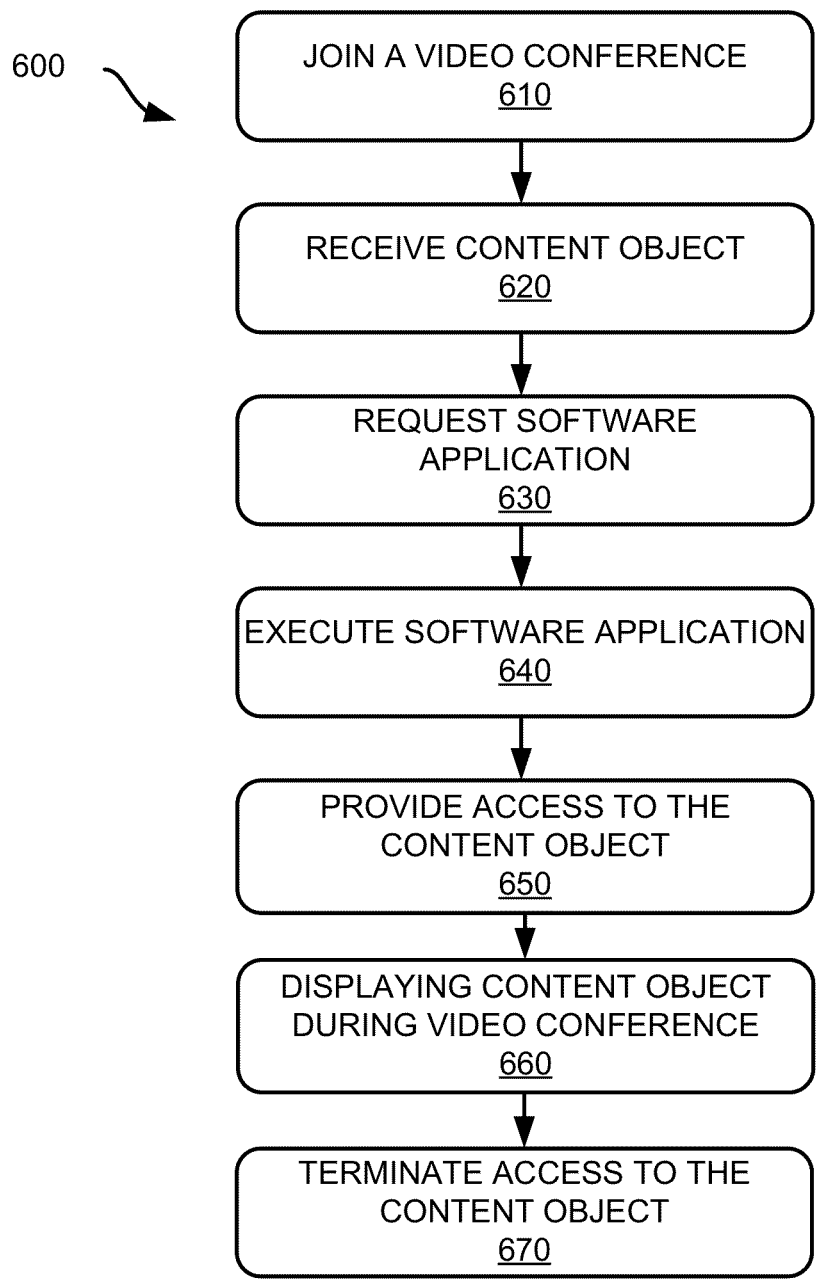

Referring now to FIG. 6, FIG. 6 shows an example method for sharing and collaborating on content objects during a video conference. This example will be discussed with respect to the system shown in FIGS. 3A-3B and the GUIs shown in FIGS. 4A-4D, but any suitable systems or GUIs may be employed according to different examples.

At block 610, a participant joins a video conference using a video conferencing application executing on their client device, e.g., client device 340a, generally as described above with respect to FIGS. 1 and 2.

At block 620, the participant's video conferencing application 350 receives a shared content object from another participant in the video conference, generally as discussed above with respect to block 550.

At block 630, the participant's video conferencing application 350 determines a software application 360 corresponding to the shared content object and determines if the software application 360 is installed. If the software application 360 is installed, the method 600 proceeds to block 640. If the software application 360 is not installed, the video conferencing application 350 transmits a request to obtain the software application 360. As discussed above, the request may be transmitted to the client device that is sharing the content object. However, it may instead (or also) be sent to a cloud server, the video conference provider, or any other computing system. In response to receiving the software application 360, the method proceeds to block 640.

At block 640, the client device 340a executes the application within the execution environment 370 provided by the video conferencing application 350, generally as described above with respect to FIGS. 3A-3B and 4A-4D.

At block 650, the video conferencing application 350 provides access to the content object to the software application, such as by providing a URL for the content object to the software application or by providing a received file to the software application 360. Upon receiving the shared content object, the software application 360 accesses it according to the access level assigned to the participant.

At block 660, the video conferencing application 350 displays the shared content object during the video conference, generally as described above with respect to block 570.

At block 670, the software application 360 receives an indication terminating access to the content object. For example, the user may close the content object or exist the software application 360. Alternatively, the participant's access to the content object may be revoked, generally as described above with respect to block 580.

Figure 7:
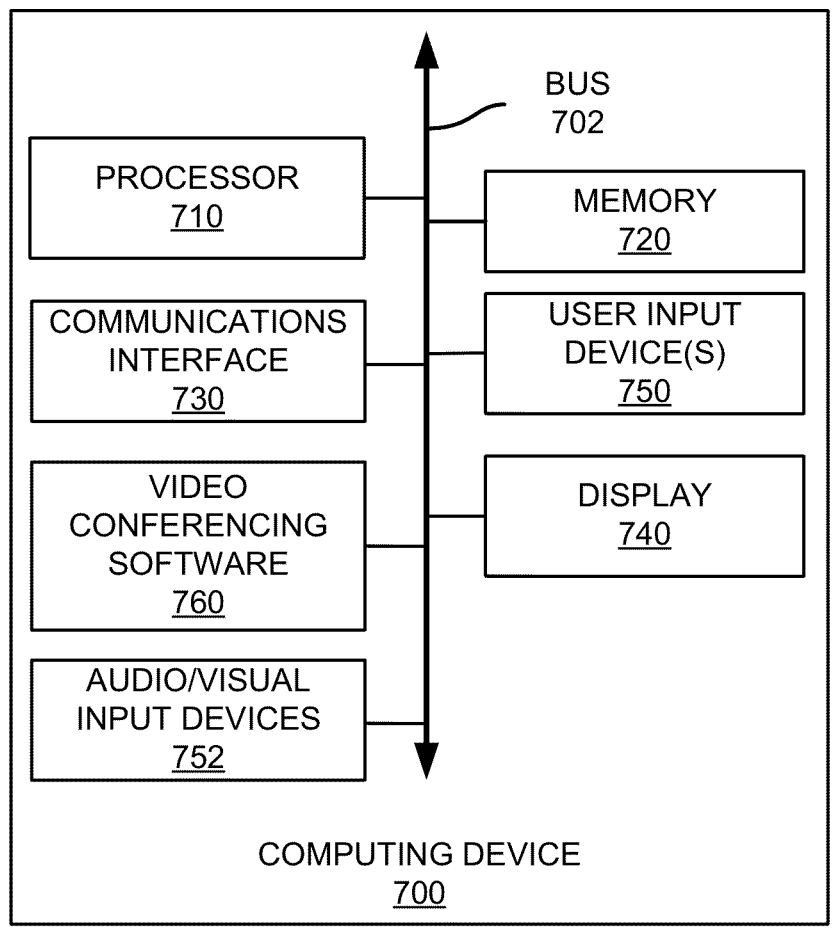
FIG. 7 shows an example computing device suitable for use with example systems and methods for sharing and collaborating on content objects during a video conference.

Referring now to FIG. 7, FIG. 7 shows an example computing device 700 suitable for use in example systems or methods for integrating software application content into video conferences according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for providing dynamic content to video conference waiting rooms according to different examples, such as part or all of the example method described above with respect to Figure . The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes video conference software 760 to enable a user to join and participate in a video conference, such as a conventional meeting or webinar, by receiving multimedia streams from a video conference provider, sending multimedia streams to the video conference provider, joining and leaving breakout rooms, providing software application content, etc. such as described throughout this disclosure, etc.

The computing device 700 also includes a communications interface 740. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

In addition to the examples discussed above, certain aspects of the disclosure may be combined in different examples. One aspect may involve joining, using a video conferencing application executed by a client device, a video conference hosted by a video conference provider, the video conferencing having one or more participants; receiving, by the video conferencing application, a content object from a first participant in the video conference; executing, within an execution environment provided by the video conferencing application, a software application corresponding to the content object; providing, by the video conferencing application to the software application, the content object; and displaying, within a graphical user interface of the video conferencing application, the software application and the content object.

A further aspect may involve determining, by the video conferencing application, whether the software application is installed on the client device; responsive to determining the software application is not installed on the device, transmitting, by the video conferencing application, a request for the software application; and receiving, by the video conferencing application, the software application.

Another aspect may involve the request for the software application being transmitted to the first client device or to the video conference provider.

A further aspect may involve receiving an indication to revoke access to the content object, and terminating access to the content object.

A still further aspect may involve deleting a local copy of the content object.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
joining, by a client device using a video conferencing application, a video conference hosted by a video conference provider, the video conference having one or more participants;
executing, by the client device within an execution environment provided by the video conferencing application, a software application to access a content object;
receiving, by the video conferencing application, a command to share the content object to the one or more participants; and
providing, by the video conferencing application, the content object to the one or more participants via the video conference provider.

2. The method of claim 1, further comprising displaying, within a first graphical user interface ("GUI") of the video conferencing application, a second GUI of the software application including the content object.

3. The method of claim 2, further comprising displaying, within the first GUI, a third GUI of the software application, the third GUI including content associated with the content object, the content included in the third GUI not provided to the one or more participants.

4. The method of claim 2, further comprising:
receiving a command to exit or terminate the video conference;
in response to receiving the command to exit or terminate the video conference, exiting or terminating, respectively, the video conference, and
continuing to display the content object in the second GUI.

5. The method of claim 1, further comprising:
receiving, from a first client device corresponding to a first participant of the one or more participants, a request for the software application; and
in response to the request for the software application, providing a copy of the software application to the first participant.

6. The method of claim 1, further comprising receiving an indication of an access level corresponding to a participant for the content object.

7. The method of claim 6, wherein the indication of the access level includes an indication that the access level persists only for the duration of the video conference.

8. A client device comprising:
a communications interface;
a non-transitory computer-readable medium; and
one or more processors communicatively coupled to the communications interface and the non-transitory computer-readable medium, the one or more processors configured to execute processor-executable instructions to:
join, using a video conferencing application, a video conference hosted by a video conference provider, the video conference having one or more participants;
execute, within an execution environment provided by the video conferencing application, a software application to access a content object;
receive a command to share the content object to the one or more participants; and
provide the content object to the one or more participants via the video conference provider.

9. The client device of claim 8, wherein the one or more processors are configured to execute further processor-executable instructions stored in the non-transitory computer-readable medium to display, within a first graphical user interface ("GUI") of the video conferencing application, a second GUI of the software application including the content object.

10. The client device of claim 9, wherein the one or more processors are configured to execute further processor-executable instructions stored in the non-transitory computer-readable medium to display, within the first GUI, a third GUI of the software application, the third GUI including content associated with the content object, the content included in the third GUI not provided to the one or more participants.

11. The client device of claim 9, wherein the one or more processors are configured to execute further processor-executable instructions stored in the non-transitory computer-readable medium to:
receive a command to exit or terminate the video conference;
in response to receiving the command to exit or terminate the video conference, exit or terminate, respectively, the video conference, and
continue to display the content object in the second GUI.

12. The client device of claim 8, wherein the one or more processors are configured to execute further processor-executable instructions stored in the non-transitory computer-readable medium to:
receive, from a first client device corresponding to a first participant of the one or more participants, a request for the software application; and
in response to the request for the software application, provide a copy of the software application to the first participant.

13. The client device of claim 8, wherein the one or more processors are configured to execute further processor-executable instructions stored in the non-transitory computer-readable medium to receive an indication of an access level corresponding to a participant for the content object.

14. The client device of claim 13, wherein the indication of the access level includes an indication that the access level persists only for the duration of the video conference.

15. A non-transitory computer-readable medium comprising processor-executable instructions configured to cause one or more processor to:
join, using a video conferencing application, a video conference hosted by a video conference provider, the video conference having one or more participants;
execute, within an execution environment provided by the video conferencing application, a software application to access a content object;
receive a command to share the content object to the one or more participants; and
provide the content object to the one or more participants via the video conference provider.

16. The non-transitory computer-readable medium of claim 15, further comprising processor-executable instructions configured to cause the one or more processors to display, within a first graphical user interface ("GUI") of the video conferencing application, a second GUI of the software application including the content object.

17. The non-transitory computer-readable medium of claim 16, further comprising processor-executable instructions configured to cause the one or more processors to display, within the first GUI, a third GUI of the software application, the third GUI including content associated with the content object, the content included in the third GUI not provided to the one or more participants.

18. The non-transitory computer-readable medium of claim 16, further comprising processor-executable instructions configured to cause the one or more processors to:
receive a command to exit or terminate the video conference;
in response to receiving the command to exit or terminate the video conference, exit or terminate, respectively, the video conference, and
continue to display the content object in the second GUI.

19. The non-transitory computer-readable medium of claim 15, further comprising processor-executable instructions configured to cause the one or more processors to:
receive, from a first client device corresponding to a first participant of the one or more participants, a request for the software application; and
in response to the request for the software application, provide a copy of the software application to the first participant.

20. The non-transitory computer-readable medium of claim 15, further comprising processor-executable instructions configured to cause the one or more processors to receive an indication of an access level corresponding to a participant for the content object.

* * * * *